United States Patent
Kiser et al.

(10) Patent No.: US 6,954,144 B1
(45) Date of Patent: Oct. 11, 2005

(54) WATER PIT TRANSMITTER ASSEMBLY

(75) Inventors: Eric Kiser, Lesage, WV (US); Steve Murray, Cross Lanes, WV (US); Bruce Shutts, Red House, WV (US)

(73) Assignee: AMCO Automated Systems, Inc., Raleigh, NC (US)

( * ) Notice: Subject to any disclaimer, the term of this patent is extended or adjusted under 35 U.S.C. 154(b) by 36 days.

(21) Appl. No.: 10/448,738

(22) Filed: May 30, 2003

(51) Int. Cl.$^7$ .............................................. G08B 1/08
(52) U.S. Cl. ........................ 340/539.26; 340/870.02; 340/606; 340/505; 340/10.1; 343/719; 361/659
(58) Field of Search .................. 340/870.02, 870.03, 340/539.1, 606, 505, 10.1; 343/719, 872; 361/659, 679

(56) References Cited

U.S. PATENT DOCUMENTS

| | | | |
|---|---|---|---|
| 3,754,250 A * | 8/1973 | Bruner ...................... 342/44 |
| 4,596,743 A | 6/1986 | Brauer et al. ............... 428/380 |
| 4,643,924 A | 2/1987 | Uken et al. .................. 428/35 |
| 4,846,721 A | 7/1989 | Debruycker et al. ......... 439/411 |
| 4,864,725 A | 9/1989 | Debbaut ...................... 29/871 |
| 5,298,894 A | 3/1994 | Cerny et al. ................. 340/870 |
| 5,371,496 A | 12/1994 | Tanamachi ............. 340/870.28 |
| 5,476,731 A | 12/1995 | Karsten et al. ............... 429/97 |
| 5,583,492 A | 12/1996 | Nakanishi et al. ...... 340/870.02 |
| 5,590,179 A | 12/1996 | Shincovich et al. ......... 379/107 |
| 5,601,460 A | 2/1997 | Shimirak et al. ........... 439/936 |
| 5,639,992 A | 6/1997 | Debbaut ...................... 174/84 |
| 5,659,300 A | 8/1997 | Dresselhuys et al. ... 340/870.02 |
| 5,703,601 A | 12/1997 | Nalbandian et al. ......... 343/700 |
| 5,801,643 A | 9/1998 | Williams et al. ....... 340/870.02 |
| 5,825,303 A | 10/1998 | Bloss, Jr. et al. ...... 340/870.02 |
| 5,877,703 A | 3/1999 | Bloss, Jr. et al. ...... 340/870.02 |
| 6,111,519 A * | 8/2000 | Bloss et al. ............ 340/870.02 |
| 6,177,883 B1 | 1/2001 | Jennetti et al. ........ 340/870.02 |
| 6,181,294 B1 | 1/2001 | Porter et al. ................. 343/859 |
| 6,218,995 B1 | 4/2001 | Higgins et al. .............. 343/719 |
| 6,300,907 B1 | 10/2001 | Lazar et al. ................. 343/700 |
| 6,304,191 B1 | 10/2001 | Campbell et al. ...... 340/870.14 |
| 6,369,719 B1 | 4/2002 | Tracy et al. ............ 340/870.02 |
| 6,369,769 B1 | 4/2002 | Nap et al. ..................... 343/719 |
| 6,378,817 B1 * | 4/2002 | Bublitz et al. ............... 248/200 |
| 6,389,690 B1 | 5/2002 | McCullough et al. ......... 29/840 |
| 6,414,605 B1 * | 7/2002 | Walden et al. ......... 340/870.02 |
| 6,434,493 B1 | 8/2002 | Olson ........................... 702/45 |
| 6,512,462 B1 | 1/2003 | Robineaua ............. 340/825.72 |
| 6,617,976 B2 * | 9/2003 | Walden et al. ......... 340/870.02 |

* cited by examiner

*Primary Examiner*—Daryl C. Pope
(74) *Attorney, Agent, or Firm*—MacCord Mason PLLC

(57) ABSTRACT

A water pit transponder assembly includes a housing with multiple sections including top, main and bottom sections snap latched together connected to a water meter. A circuit board transponder in the housing includes a controller, a transmitter, a receiver and tamper detection software connected to antennas. An encoder is connected to the water meter, and batteries provide power to operate the assembly. The transponder sends and receives at different frequencies through different antennas and is protected from environmental corrosion by being encapsulated in a get inside the housing.

51 Claims, 9 Drawing Sheets

WATER PIT TRANSMITTER ASSEMBLY

BACKGROUND OF THE INVENTION

This invention relates to an assembly attached to a water meter capable of receiving meter readings, encoding them, and transmitting the encoded meter readings to a remote mobile location.

In moderate climate zones, water meters are located in underground enclosures in areas adjacent to residences, businesses or other dwellings. These enclosures are referred to as "pits" and frequently have pit lids that cover the enclosure and the water meter within the enclosure. In the last decade or so, there have been various attempts to read such meters remotely, via RF communications.

Previous attempts to make devices of this type required elaborate design to ensure that the assembly is sealed against environmental conditions in its operating environment. The resulting devices are somewhat bulky and cumbersome to install and operate. In addition, previous assemblies were subject to tampering, giving false readings or disabling the device. Many of the previous assemblies transmit and receive signals on the same frequency. Therefore, there is a need in the art for a simpler design that is less bulky, easy to install and tamper-proof or tamper evident and have the ability to transmit and receive signals on different frequencies to allow the remote unit to more reliably selectively interrogate and receive signals from one of several pit transponders within its range.

SUMMARY OF THE INVENTION

The present invention fulfills one or more of these needs by providing a water pit transmitter assembly including a housing with multiple sections connected to a water meter, transmit and receive antennas, a circuit board transponder connected to the antennas to transmit meter readings to a remote location and receive interrogation signals, and an independent power source. The preferred housing is made of plastic and is in three sections. The sections include a main section, a top section and a bottom section. The housing sections are preferably secured together with snap latches. The bottom section may include a battery compartment and a battery housing to hold batteries that provide power to operate the water pit transmitter assembly.

The circuit board transponder is typically located in the main housing. The antennas may be soldered to the circuit board transmitter and may be rectangular antennas made from sheet metal. There are preferably separate antennas to receive and transmit signals. The housing may include a threaded stalk. An upper cap may be provided with an opening that receives the threaded stalk. The antennas, soldered to the circuit board transponder, are typically located within the stalk in the top housing.

The water pit transmitter is typically attached to a water meter that is located within a pit. The pit includes a pit lid having a circular opening. The housing further preferably includes a mounting cap made of plastic. The mounting cap may include a tamper plug. The tamper plug is typically made of plastic and prevents the mounting cap from being unscrewed from the pit lid. The threaded stalk is inserted through the opening of the pit lid, the mounting cap is then screwed on the stalk, affixing it to the pit lid. The cap is held down to the pit lid by tightening a threaded locking ring on the threaded stalk.

The assembly typically includes batteries which are placed within the battery compartment of the battery housing. Battery wires connect the batteries to the circuit board transponder. The housing is also typically provided with a data cable. An encoder is usually connected to the water meter. The data cable is connected from the encoder to the circuit board transponder, so the circuit board transponder receives encoded meter readings from the water meter through the data cable. A protective material such as a gel preferably covers the components in the multiple sections of the housing. Plastic shields may cover the transmitter circuitry and both antennas to prevent frequency detuning caused by the protective encapsulating material.

In a preferred embodiment, the meter readings are received by the controller up to four times a day at spaced intervals and are stored for a period of time. The storage time for the daily meter readings is typically thirty-five days. The circuit board transponder typically provides a transmitter, a receiver, and a controller. The circuit board may also include a tamper detection circuit. The controller receives tamper detection information from the tamper detection circuit. The apparatus may also include circuitry to reset the tamper detection circuit after the controller receives the tamper information.

A mobile transmitter/receiver may be activated to signal the circuit board transponder receiver when water meter readings are needed. The signal sent to the receiver is an encoded signal. When the receiver receives the encoded signal, it relays the signal to the controller. The controller forwards stored, encoded water meter readings to the transmitter, which transmits the encoded readings to the remote transmitter/receiver through the transmitting antenna. The circuit board preferably receives and transmits messages at different frequencies.

The controller controls and activates the functions of the assembly. The functions include a low power required sleep-state mode, the normal operating mode of the assembly, a receive-state, (which is activated upon receipt of an encoded message from the remote transmitter/receiver), a transmit mode (which is activated upon receipt of an encoded message from the remote transmitter/receiver), and an AFC (automatic frequency control) state to periodically sweep the receiver frequency band in order to make adjustments to the transmitter frequency to compensate for changes in environmental and electronic conditions. The water pit transmitter is designed to transmit meter readings to a unit. The meter signals the transmitter with meter reading data, and the transmitter transmits the meter readings. The apparatus eliminates the need for an individual to physically read the water meter. Service personnel can drive by the property and send the appropriate signal to alert the transmitter. The transmitter then provides the appropriate meter readings by response transmission to the mobile receiver.

The preferred new water pit transmitter assembly has an antenna and a battery-operated circuit board transponder. The antenna and circuit board transponder are soldered together, so the antenna stands up right on the circuit board and placed within the housing unit. Thus, a single housing enclosure contains both the antenna and the transponder circuit board. The housing unit is made of plastic and is composed of sections. A main section of the housing holds the circuit board. The housing unit has a plastic threaded stalk. The threaded stalk is inserted through an opening in the pit lid and held in place with a threaded plastic mounting cap. The mounting cap contains a tamper plug. The antenna placement on the circuit board permits the antennas to extend up into the threaded stalk, so that the installed position, the antennas extend above the pit lid. A plastic threaded locking ring above the pc board portion of the housing secures the housing to the pit lid. The housing contains the battery storage and wire splice compartments. The housing has snap latches to fasten a bottom plate to the housing to substantially close the housing without sealing it. Data cable and battery wires within the housing are positioned and connected to the transponder circuit board. A cover with snap latches fits over the battery and wire splice compartments. The data cable is attached to the meter to relay readings to the transponder circuit board and before the bottom plate is snap latched to the housing. Plastic shields may be used to cover the transmitter circuitry and both antennas to prevent frequency detuning caused by the protective encapsulating material. After the data cable and the battery wires are connected, a protective material is placed within the housing. This material protects the circuit board, antenna, battery and wire connections from corrosive environmental components. The housing itself is not sealed and has openings to the outside. These openings include the cable inlet and seams where the housing elements fit together.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
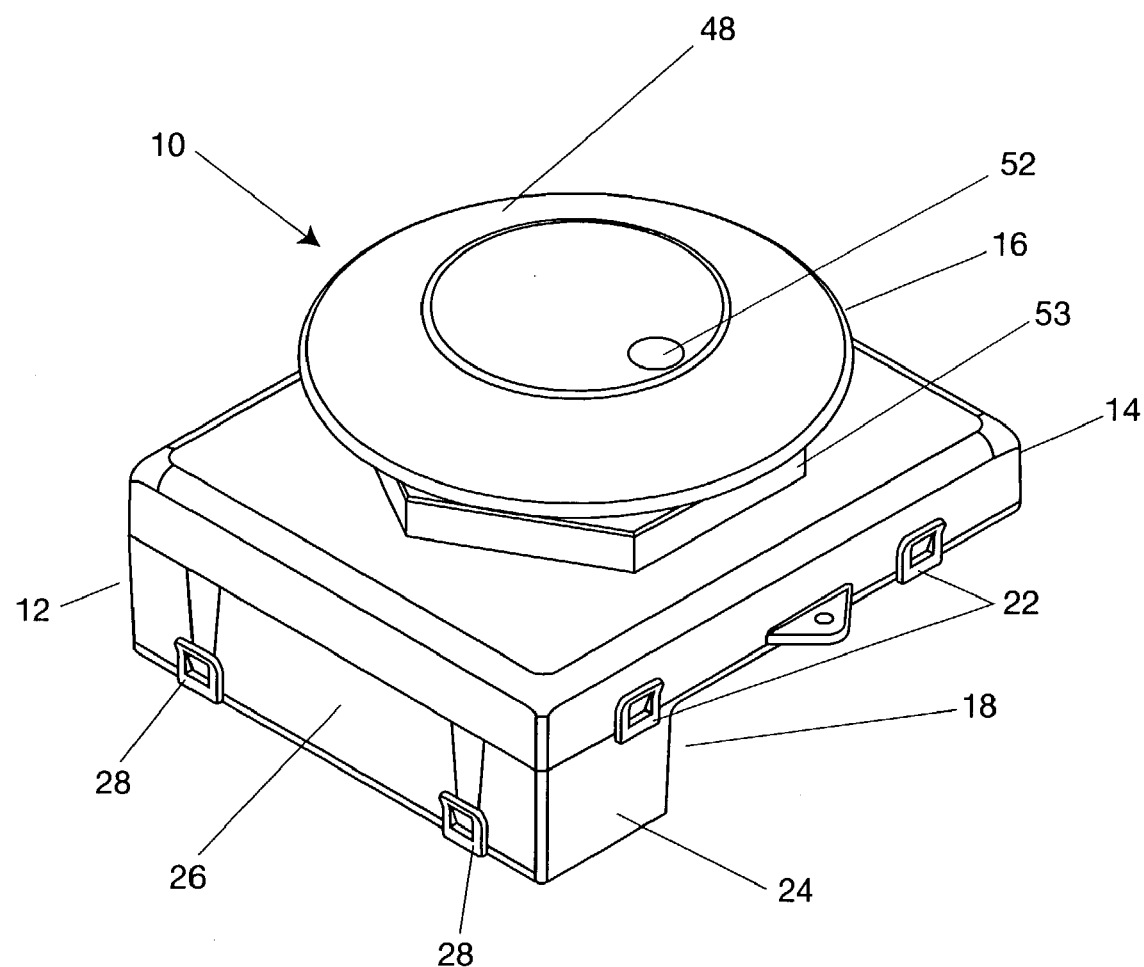
FIG. 1 is a top perspective view of a preferred embodiment of the invention.

In the following description, like reference characters designate like or corresponding parts throughout the several figures. It should be understood that the illustrations are for the purpose of describing preferred embodiments of the invention and are not intended to limit the invention thereto.

Figure 1A:
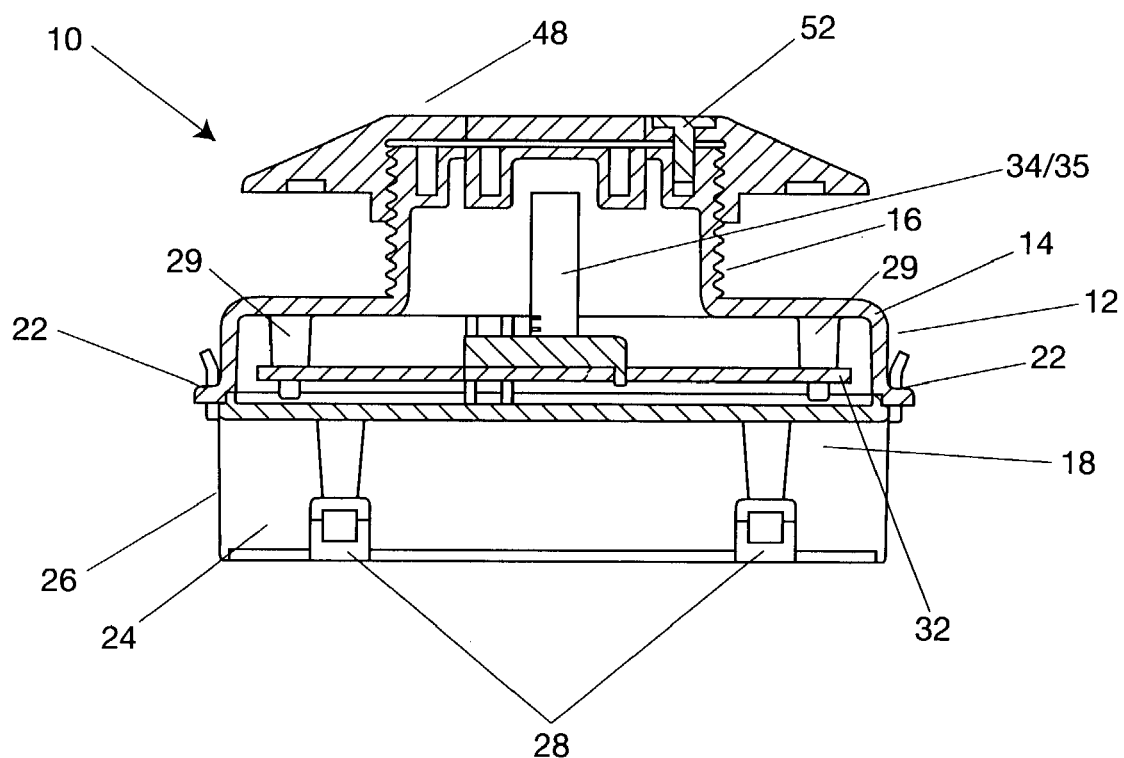
FIG. 1A is a side perspective, partly sectional, view of a preferred embodiment of the invention taken along lines I—I of FIG. 1B.
Figure 1B:
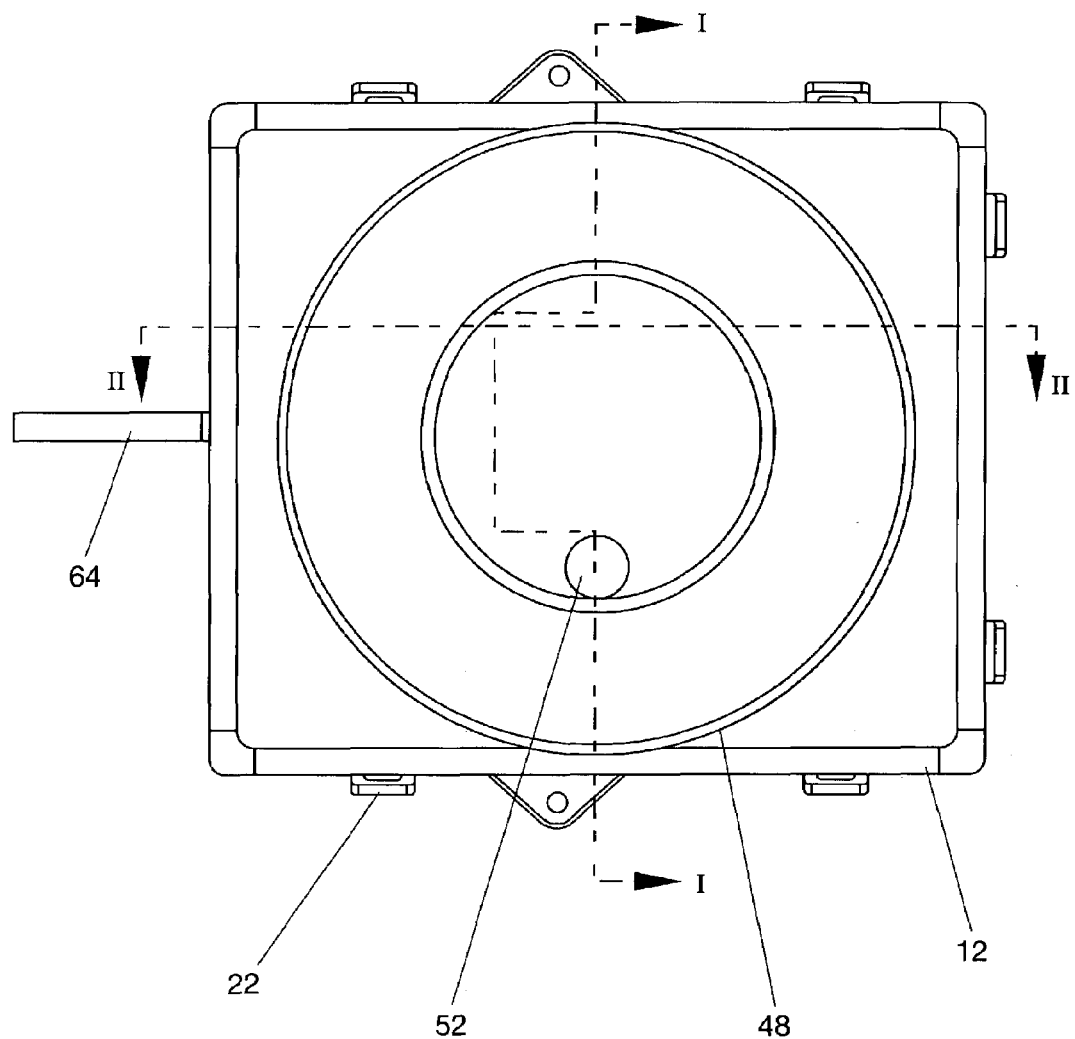
FIG. 1B is a top perspective view of the embodiment of FIG. 1.
Figure 2:
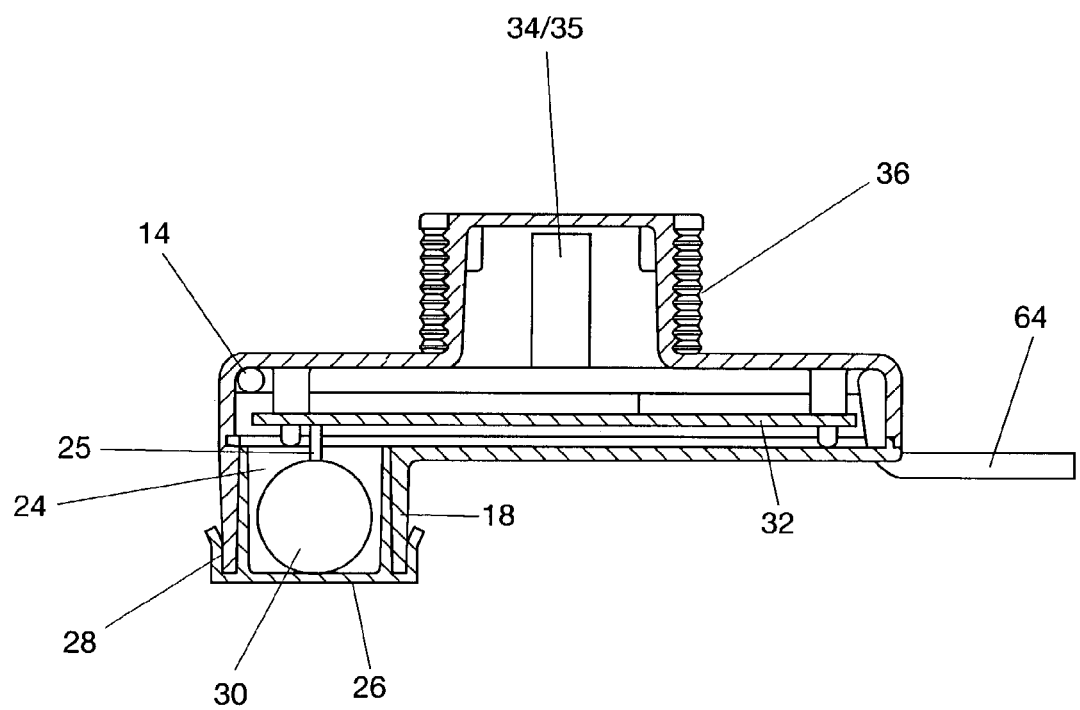
FIG. 2 is a sectional view of the embodiment of FIG. 1 taken along lines II—II of FIG. 1B.
Figure 2A:
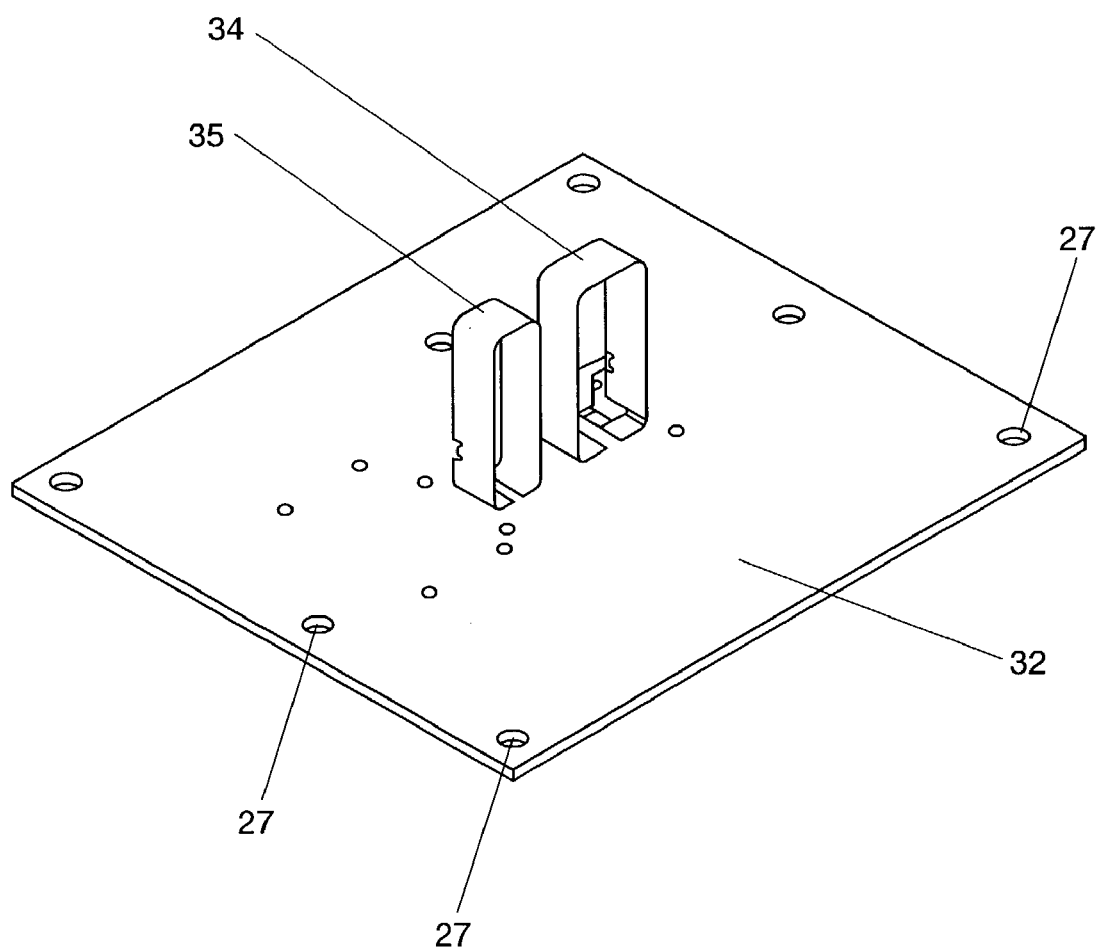
FIG. 2A is a perspective view of the circuit board and antennas mounted thereon.

As best seen in FIGS. 1, 1A and 2, the water pit transmitter assembly 10 includes a housing 12 with multiple sections. The housing 12 is made of plastic and includes the main section 14, a top section 16 and a bottom section 18. The top section 16 is preferably configured as a cylindrical stalk of a size and shape to fit within a round hole, as is typically found on water pit lids. The top section houses the antennas, the main section houses the main electronics circuit board and the bottom section 18 houses the batteries for the unit.

The bottom faces of the main and bottom sections are fastened to the remainders of those sections with snap latches 22 and 28. The snap latches 22 and 28 have a male and female component. The male components are stationary on the sides of both the main section 14 and bottom section 18 as protruding lugs. The female components depend from edges of the face to be attached and have gaps positioned to receive the lugs on the sides when the face covers its corresponding section. The female component has resilience, so that it can pass over the lug during installation and snap into place, with the lug secured in the gap. Making the housing and its closing face of plastic of suitable resilience works well. In the closed position, the latch fits over the male component, securing the housing 12 parts together. The bottom faces can be removed for access to the respective sections by prying the female components outwardly so they can pass downwardly past the lugs. In the preferred embodiment, the bottom housing is molded as a downward extension of the covering face for the main section, with an open area within the downward extension at the plane of the covering face for the main section to permit communication between the bottom section and the main section.

As seen in FIG. 2, the bottom section 18 includes a battery compartment 24 adapted to contain batteries 30 and wires 25 attached from the batteries 30 to the circuit board transponder 32, providing the power to operate the assembly 10. The compartment is bounded by the lower face of the bottom section which has upwardly extending peripheral walls that nest into the downward extension from the main housing cover, as seen in FIG. 2. Snap latches 28 affix this battery housing 26 to the battery compartment 24. The preferred batteries 30 are selected to have a battery life of between 16–18 years of use before replacement, such as Maxell lithium batteries rated for 2.75 amp-hours. This battery life is assumed to be possible with a 1.5 second receive mode duty cycle, with 2.0 milliseconds for the receiver chain and 2.5 milliseconds for the controller. The balance of the period is assumed to be sleep mode, with negligible power usage in the transmit mode because of its brevity. A 50% capacity reduction due to self-leakage is assumed for the battery.

Again referring to FIGS. 1, 1A and 2, and 2A, a circuit board transponder 32 is located within a main housing 14. Holes 27 in the board are positioned to receive posts 29 depending from the top face of the main section and to be secured thereto, such as by a press fit. The antennas 34 and 35 are soldered to the circuit board transponder 32. The antennas 34 and 35 are constructed of rectangular sheet metal. Other antenna configurations, such as helical, may be substituted. One antenna 34 is used to receive signals and the other antenna 35 is used to transmit signals. The receiving antenna 34 is configured to receive messages at approximately 451 MHz, and the transmitting antenna 35 is configured to transmit messages at 415 MHz. Those of ordinary skill in the art will know how to configure suitable antennas for these frequencies.

The top section 16 includes the stalk having external threads 36. The antennas 34 and 35 extend through the threaded stalk, so that they are above the pit lid 44 (see FIG. 3) within the top section 16, avoiding the shielding effect of the metal pit lid.

Figure 3:
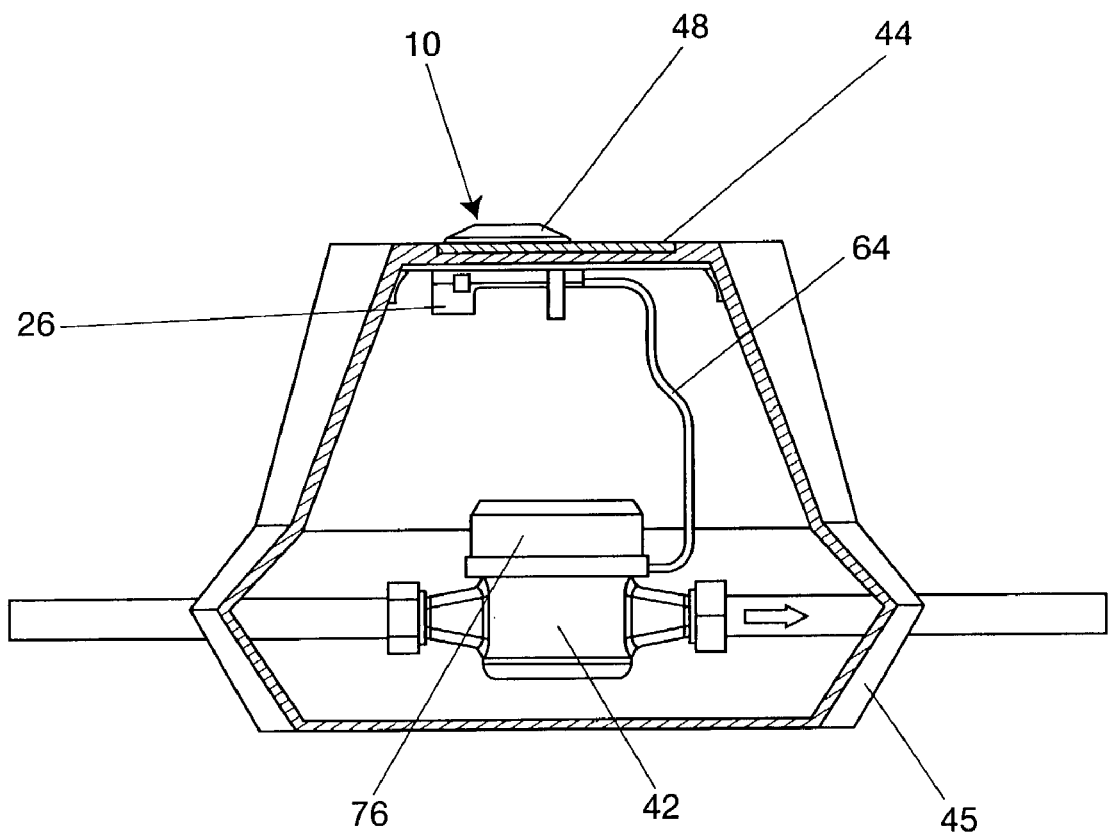
FIG. 3 is a perspective view of the embodiment of FIG. 1 connected to a water meter in a water meter pit with the pit partially broken away.

FIG. 3 shows the water pit transmitter assembly 10 associated with the water meter pit. The water meter pit includes a pit housing 45 and a pit lid 44. The pit lid 44 has a circular opening that receives the threaded stalk 36. A mounting cap 48 is screwed onto the threaded stalk 36, which holds the assembly suspended from the pit lid 44. A threaded locking ring 53 (see FIG. 1) on the threaded stalk 36 can be screwed upwardly to grasp the pit lid 44 between the ring 53 and the mounting cap 48 to minimize wobble of the assembly as attached to the lid.

Figure 4:
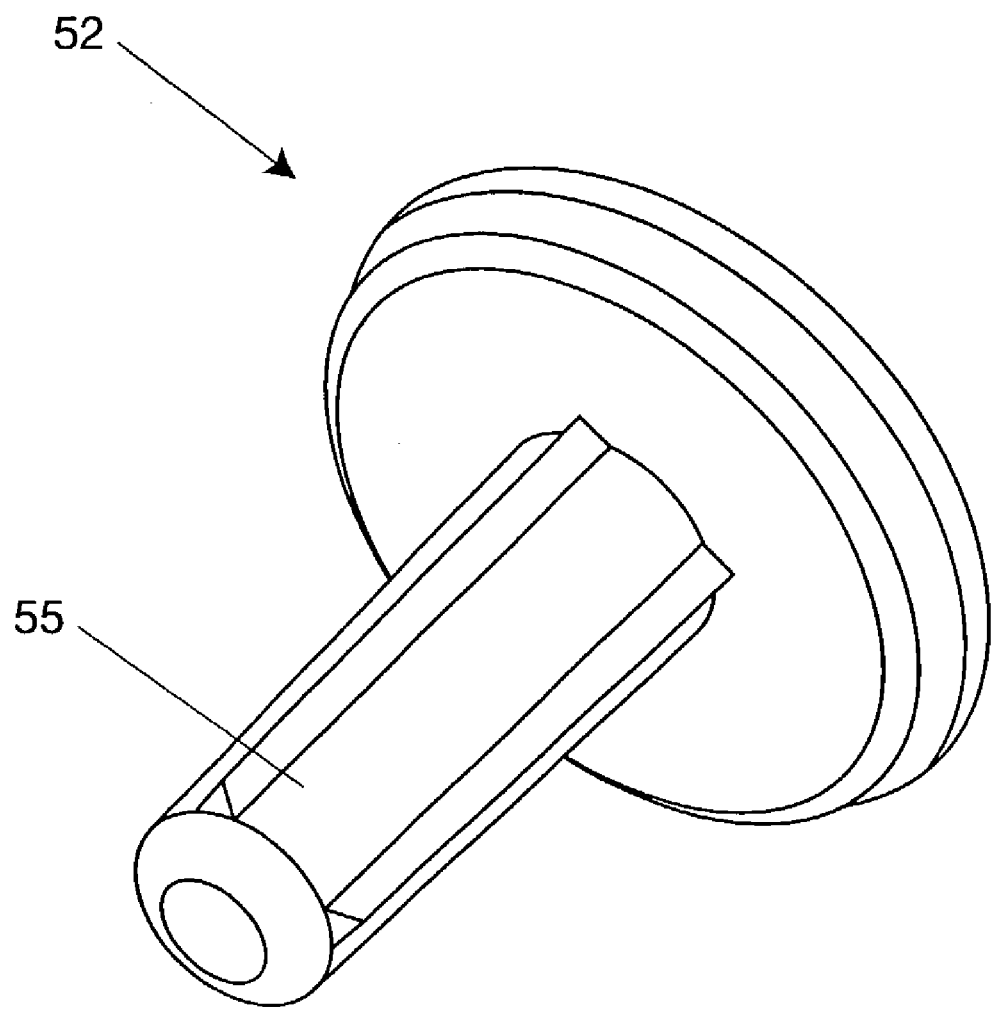
FIG. 4 is a perspective view of a preferred embodiment of a tamper plug.
Figure 5:
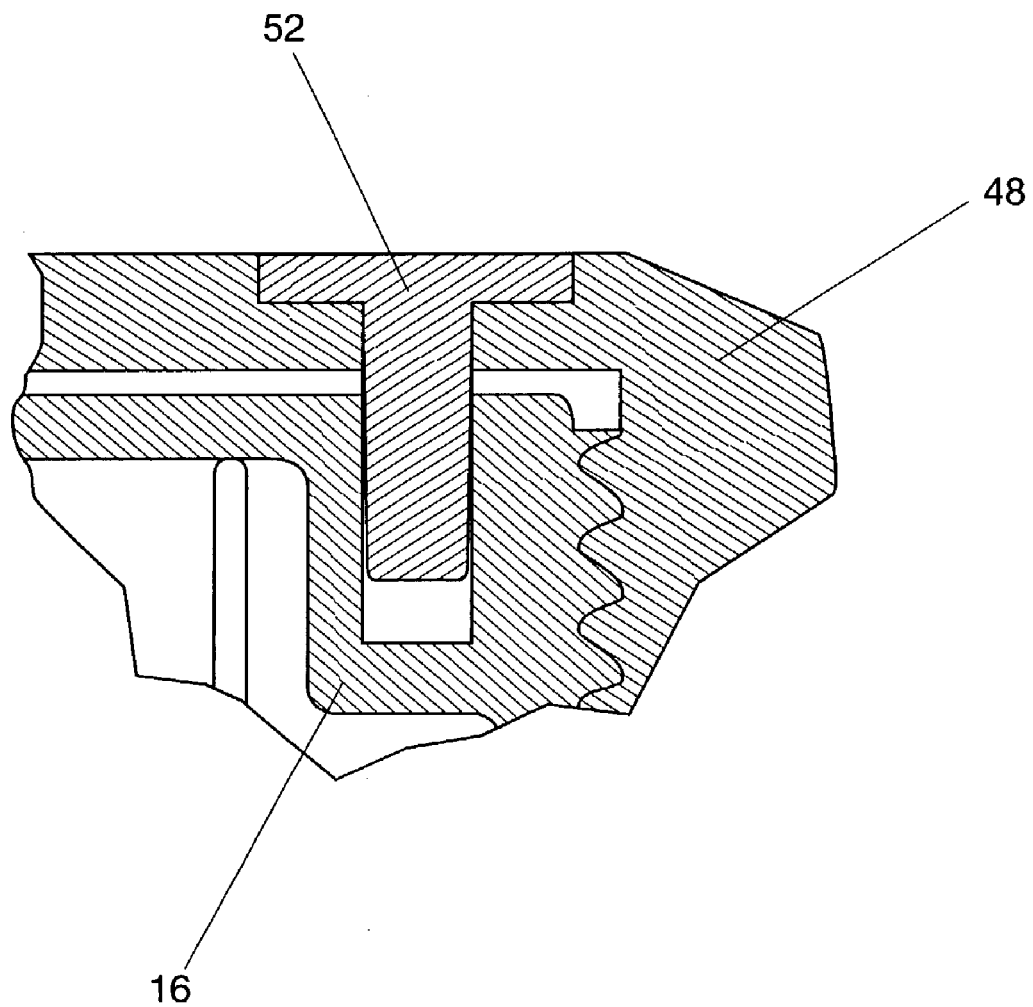
FIG. 5 is a sectional view of the tamper plug installed in the housing of FIG. 1.

The mounting cap 48 has a hole, as does the top of the stalk 36. Referring to FIGS. 1, 4 and 5, a tamper plug 52 made of plastic includes a stem 55 that fits snugly within the hole in the mounting cap 48 and into the hole in the top section housing 16 when the holes are aligned. The tamper plug 52 prevents the cap 48 from being unscrewed from the stalk 36 inadvertently or by vandals desiring access to the assembly 10.

As seen in FIG. 3, a conventional encoder 76 is attached to the water meter 42 and is connected to the circuit board transmitter 32 by a data cable 64. The encoder sends pulses or other indicia when quanta of water pass the meter 42.

Figure 6:
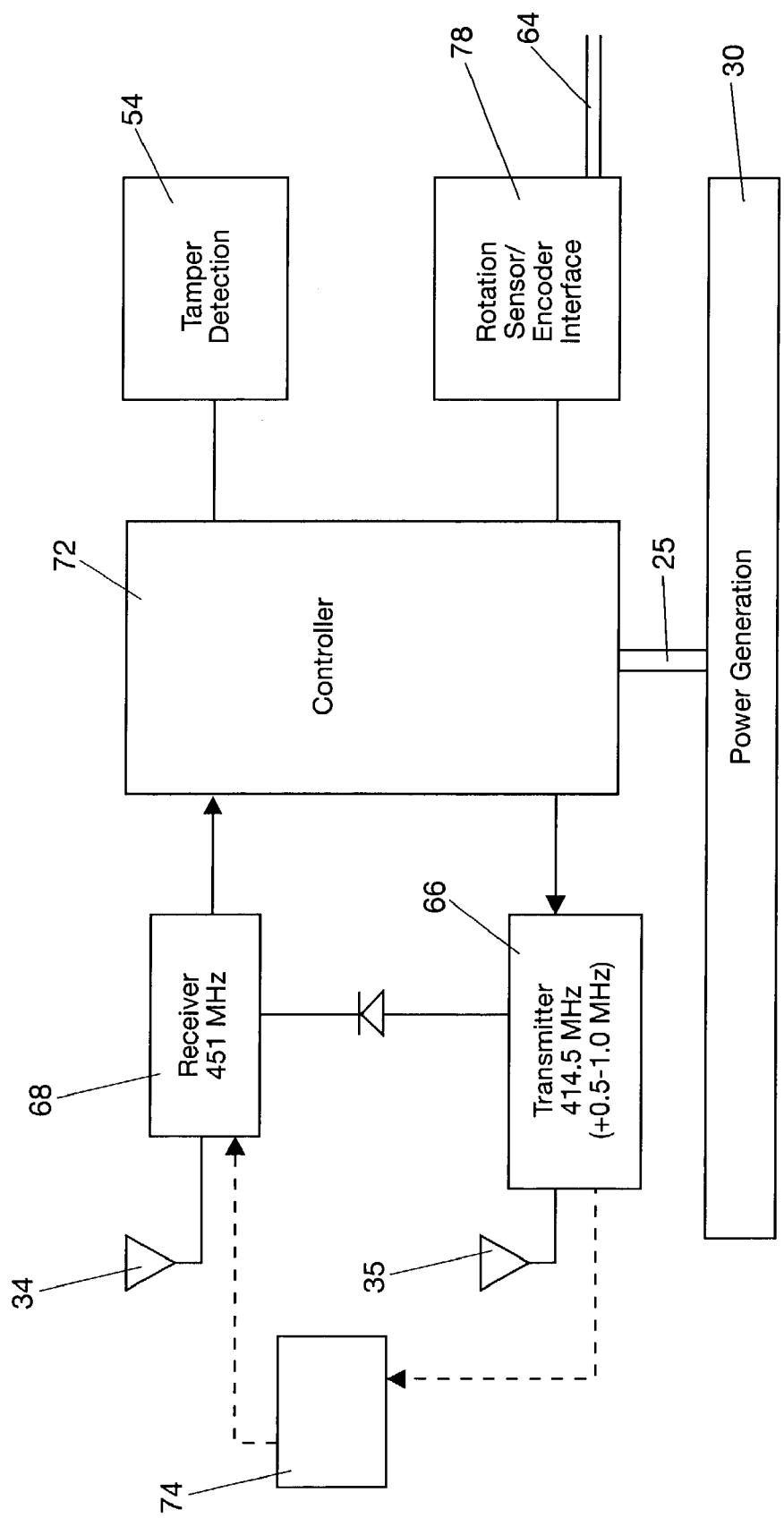
FIG. 6 is a schematic drawing representing the functional components of the circuit board transponder.

FIG. 6 is a functional block diagram that shows the electrical circuit elements of the system. The circuit board transponder 32 has a receiver 68 connected to the receiving antenna 34, a transmitter 66 connected to the transmitting antenna 35, and the integrated circuit controller 72. The controller 72 controls the functions of the water pit transmitter assembly 10. The transponder is configured to communicate with a remote transmitter/receiver 74. This transmitter/receiver 74 is in a remote location, which is typically mobile, such as on a truck or other vehicle. The controller 72 receives and stores encoded water meter readings (such as pulses) from the encoder 76 via cable 64. As will be apparent, the circuit board transponder, (typically the controller) preferably includes a memory for storage of this data. The memory is preferably large enough to hold at least 35 days of readings before overwriting oldest data. These are read and interpreted in Rotation/Sensor/Encoder Interface 78 in conventional fashion before storage. In a preferred embodiment, the meter readings are received by the controller 72 up to four times a day at spaced intervals. The use of readings for multiple times of the day provides more precise determination of water usage by respective tenants in the facility served in the case of move-in, move-outs.

When meter readings are desired, the remote transmitter/receiver 74 signals the circuit board transponder receiver 68. The receiver 68 forwards the request for meter readings to the controller 72. The controller 72 receives encoded meter readings from memory and passes the encoded meter readings to the transmitter 66 together with information such as a serial number for the unit to identify the source of the data. The transmitter 66 transmits the encoded meter readings to the remote transmitter/receiver 74.

The assembly 10 also contains electronic tamper detection circuitry 54 and uses one or the other or both of two methods to detect an open circuit or short circuit tamper condition. The first method utilizes pulse-based input signals generated by the controller 72. This method periodically sends a short electrical pulse along a length of interface cable from the circuit board transponder 32. There is an electrical return path at the end of the cable that relays the detection pulse back to the controller 72. If the detection pulse is not received back, the controller signals a tamper condition, which it stores in memory for transmission the next time the unit is queried by the remote unit 74. A second method that may be used is an encoder-style source that sends consumption information back in the form of a coded message. If the information in this message is corrupted, the controller assumes a tamper condition exists, and sets a tamper condition. The remote unit 74 may also be used to remotely reset a tamper indication once the tamper condition has been recorded by the circuit board transponder 32. Tamper conditions may be forwarded via the transmitter 66 to the remote unit 74. Those of ordinary skill in the art will be able to select and configure suitable specific hardware and software components to achieve the functions desired herein. Examples of protocols that may be useful in the data collection and transmission are set forth in U.S. Pat. No. 6,512,462 to Campbell, et al. entitled Bi-directional Protocol and/or U.S. Pat. No. 6,304,191 to Campbell, et al. entitled Uni-directional Protocol, both of which are assigned to the assignee of this application.

In order to maintain battery life, the controller 72 controls the various functions of the water pit transmitter assembly 10. The normal operating mode of the water pit transmitter assembly is a sleep-state condition. While the assembly is in this mode, a low power is required status; the unit receives and records pulses from the encoder 76 and keeps time to know when to leave this status. The controller 72 periodically activates the receive state to check for RF signals from a remote unit. If no valid signal is received within a 2 millisecond period, the controller reverts to sleep mode. If a valid signal is received, the controller processes any encoded message received from the remote transmitter/receiver 74 via the circuit board transponder receiver 68. Such processing typically includes encoding a meter-reading message and transmitting it to the remote unit 74 via the transmitter 66. In the event of a stored tamper condition indication, the controller encodes a message to that effect for transmission by the transmitter 66.

In addition, the controller 72 preferable also has an Automatic Frequency Control (AFC) state. In this AFC state, the controller directs a periodic sweep of the receiver frequency band in order to make adjustments to the transmitter frequency to compensate for changes in environmental and electronic conditions.

The preferred embodiment of the water pit transmitter assembly 10 is compatible with the following remote transmitter/receivers available from AMCO Automated Systems, Inc., 107 Erskine Lane, Scott Depot, W. Va. 25560, assignee of this application: 1. Mini Mobile Interrogator; 2. Universal R.F. Interrogator; 3. Portable Interrogator; and 4. Short Range Portable Interrogator.

The contents of the housing 12, including the top section 16, main section 14, and bottom section 18, are packed with an encapsulating material such as a gel for protection against the environment. A suitable gel is a silicone-based material with a very low durometer (20–30 Shore A). This material provides good environmental protection, but has very low adhesion to the housing. Alternatively, a urethane-based material having excellent adhesion to the housing and providing good environmental protection may be used. One material that may be suitable is disclosed in U.S. Pat. No. 6,389,690 to McCullough et al. entitled Method of coating printed circuit board. Alternative gels may include those disclosed in U.S. Pat. No. 5,639,992 to Debbaut, entitled "Method and device for making a protected electrical connector," U.S. Pat. No. 4,643,924 to Uken et al., entitled "Protective article comprising an elastic gel," or U.S. Pat. No. 5,601,460 to Shimirak, et al. entitled "Gel filled modular electrical connecting block," assigned on their face to Raychem. Another candidate is the product disclosed in U.S. Pat. No. 4,596,743 to Brauer et al, entitled "Grease Compatible extended polyurethanes," assigned on its face to CasChem, Inc. Other suitable gels may be used.

In order to prevent frequency detuning caused by the protective encapsulating material, plastic shields (not shown) may be mounted on the board covering the transmitter circuitry and both antennas. Other protective means can be substituted.

As used herein, "transceiver" means any means capable of both transmitting and receiving, whether completely separate or sharing components.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A water pit meter reading transponder assembly comprising;
    a housing adapted to be mounted to a water pit lid;
    a circuit board transponder within the housing including a transmitter, receiver, controller and separate transmit and receive antennas;
    a data cable from a water meter to the circuit board transponder to communicate water meter readings to the transponder,
    whereby a remote unit can transmit a query to the transmitter assembly for reception by the receive antenna and receiver, processed in the controller, and a reply is transmitted by the transmitter via the transmit antenna.

2. A water pit meter reading transponder assembly as claimed in claim 1 wherein the housing includes a portion extending above the pit lid and the antennas extend into the portion of the housing so that RF transmissions and receptions are not shielded by the pit lid.

3. The water pit meter reading transponder assembly according to claim 1, wherein the antennas are affixed to the circuit board of the transponder.

4. The water pit meter reading transponder assembly according to claim 3, wherein the antennas are rectangular and made of sheet metal.

5. A water pit meter reading transponder assembly comprising;
    a housing adapted to be mounted to a water pit lid and including a portion extending above the pit lid;
    a circuit board transponder within the housing including a transmitter, receiver, controller and separate transmit and receive antennas that are rectangular sheet metal attached to the circuit board and that extend into the portion of the housing so that RF transmissions and receptions of the antennas are not shielded by the pit lid;
    a data cable adapted to be connected from a water meter to the circuit board transponder to communicate water meter readings to the transponder,
    whereby a remote unit can transmit a query to the transponder assembly for reception by the receive antenna and receiver, processed in the controller, and a reply is transmitted by the transmitter via the transmit antenna.

6. A water pit meter reading transponder assembly comprising;
    a closed but unsealed housing adapted to mount to a pit lid of a water meter pit;
    a transceiver, battery, and controller within the housing;
    transmit and receive antennas affixed to a circuit board transponder within the housing; and
    a protective material encapsulating the contents of the housing to provide environmental protection to the transceiver, battery, antenna and controller within the housing.

7. The water pit meter reading transponder assembly according to claim 6, wherein the housing is made of plastic.

8. The water pit meter reading transponder assembly according to claim 6, wherein the housing includes a main section, a top section, and a bottom section.

9. The water pit meter reading transponder assembly according to claim 8, wherein the housing includes a compartment having a face that attaches to the housing and is easily removable in the field.

10. The water pit meter reading transponder assembly according to claim 9, wherein the compartment having a face contains a battery and the face is removable for battery replacement.

11. The water pit meter reading transponder assembly according to claim 8, further comprising plastic shields covering the transceiver and antenna to prevent frequency detuning caused by the protective encapsulating material.

12. The water pit meter reading transponder assembly according to claim 6, wherein the encapsulating material is a gel.

13. A water pit meter reading transponder assembly comprising;
    a housing adapted to be mounted to a water pit lid;
    a circuit board transponder within the housing including a transmitter, receiver, controller and antenna;
    a data cable adapted to be connected to a water meter encoder from the circuit board transponder to communicate water meter readings to the transponder,
    whereby a remote unit can transmit a query to the transponder assembly for reply of meter reading data and
    wherein the controller is configured control and activate operational functions of the water pit transponder assembly including these states:
        a sleep-state mode requiring low power as an operating mode of the assembly for a substantial majority of the time;
        a receive state to check for RF signals from a remote unit and to act on received RF signals, and
        a transmit mode activated upon receipt of encoded meter readings.

14. The water pit meter reading transponder assembly of claim 13 wherein the functions include an AFC (automatic frequency control) state to periodically sweep a frequency band used by the receiver in order to make adjustments to a frequency to compensate for changes in environmental and electronic conditions.

15. The water pit meter reading transponder assembly according to claim 13, further comprising a tamper detection circuit and wherein the controller receives and stores tamper detection information from the tamper detection-circuit.

16. The water pit meter reading transponder assembly according to claim 13, wherein during the sleep state the controller receives and stores meter readings multiple times a day at spaced intervals.

17. The water pit meter reading transponder assembly according to claim 13, wherein during the sleep state the controller receives and stores meter readings four times a day at spaced intervals.

18. The water pit meter reading transponder assembly according to claim 13, wherein during the sleep state the controller receives and stores meter readings for a set period of time.

19. The water pit meter reading transponder assembly according to claim 13, wherein during the sleep state the controller receives and stores daily meter readings for thirty five days.

20. A water pit meter reading transponder assembly comprising;
    a housing adapted to be mounted to a water pit lid;

a circuit board transponder within the housing including
a transmitter, receiver, controller and antenna;
a data cable adapted to be connected to a water meter from
the circuit board transponder to communicate water
meter readings to the transponder, the controller being
adapted to receive and store meter readings from the
water meter multiple times a day at spaced intervals,
whereby a remote unit can transmit a query to the transponder assembly for reply of meter readings as of one
of several times in a day over a period.

21. The water pit meter reading transponder assembly according to claim 20, wherein the controller receives and stores meter readings up to four times a day.

22. The water pit meter reading transponder assembly according to claim 20, wherein the controller stores meter readings for a set period of time.

23. The water pit meter reading transponder assembly according to claim 20, wherein the controller stores daily meter readings for thirty-five days.

24. A water pit meter reading transponder assembly comprising;
a housing adapted to be mounted to a water pit lid;
a circuit board transponder within the housing including
a transmitter, receiver, controller and antenna;
a data cable adapted to be connected to a water meter from
the circuit board transponder to communicate water
meter readings to the transponder, the controller being
adapted to receive and store daily meter readings from
the water meter for thirty five days, whereby a remote
unit can transmit a query to the transmitter assembly for
reception by the receive antenna and receiver, processing in the controller, and reply transmitted by the
transmitter via the transmit antenna for a full monthly
billing cycle.

25. A water pit meter reading transponder assembly comprising;
a housing having a portion to extend through and be
mounted to a water pit lid, the portion extending
through the pit lid having first threads and a first hole,
a mounting cap having second threads configured to mate
with the first threads so the cap can be screwed to the
portion extending through the pit lid and having a
second hole that is aligned with the first hole at a
rotation of the mounting cap with respect to the portion;
a plug configured to pass through the aligned first and
second holes to prevent rotation of the mounting cap
and thereby prevent its being unscrewed from the
portion, and
circuitry within the housing adapted to be connected to a
water meter to receive and store meter readings from
the water meter,
whereby a remote unit can transmit a query to the circuitry
to obtain stored water meter readings.

26. A water pit meter reading transponder assembly comprising;
a housing adapted to be mounted to a water pit lid;
a circuit board transponder within the housing including
a transmitter, receiver, controller and antenna;
a data cable adapted to be connected to a water meter
encoder from the circuit board transponder to communicate water meter readings to the transponder, the
controller being adapted to receive and store meter
readings from the water meter encoder, and
a tamper detection circuit connected to the controller to
indicate tampering with the assembly.

27. A water pit meter reading transponder assembly as claimed in claim 26 wherein the tamper detection circuit sends an electrical pulse along a length of interface cable from the circuit board transponder and awaits a return pulse from the end of the interface cable and indicates a tamper condition to the controller if no pulse is returned.

28. A water pit meter reading transponder assembly as claimed in claim 26 wherein the tamper detection circuit indicates a tamper condition to the controller if data from an encoder is corrupted.

29. A water pit meter reading transponder assembly as claimed in claim 26 wherein the controller communicates a tamper condition to a remote unit via the transmitter.

30. A water pit meter reading transponder assembly according to claim 26 including circuitry to reset the tamper detection circuit after the controller receives the tamper detection information.

31. A water pit meter reading transponder assembly comprising;
a housing adapted to be mounted to a water pit lid;
a circuit board transponder within the housing including
a transmitter, receiver and controller and separate transmit and receive antennas;
a data cable adapted to be connected to a water meter from
the circuit board transponder to communicate water
meter readings to the transponder, the controller being
adapted to receive and store meter readings from the
water meter multiple times a day at spaced intervals,
whereby a remote unit can transmit a query to the transponder assembly for reception by the receive antenna
and receiver, processing in the controller, and reply
transmitted by the transmitter via the transmit antenna
as of one of several times in a day over a period.

32. A water pit meter reading transponder assembly comprising;
a closed but unsealed housing adapted to mount to a pit lid
of a water meter pit;
a transponder including a transceiver, battery, transmit
and receive antennas and a controller within the housing; and
a protective gel encapsulating the transceiver, battery,
antennas and controller within the housing,
a data cable adapted to be connected to a water meter from
the transponder to communicate water meter readings
to the transponder, the controller being adapted to
receive and store meter readings from the water meter
multiple times a day at spaced intervals,
whereby a remote unit can transmit a query to the transponder assembly for reception by the receive antenna,
processing in the controller, and reply transmitted by
the transmit antenna as of one of several times in a day
over a period.

33. A water pit meter reading transponder assembly comprising;
a housing adapted to be mounted to a water pit lid;
a circuit board transponder within the housing including
a transmitter, receiver, controller and antenna, the controller being adapted to receive and store meter readings from a water meter multiple times a day at spaced
intervals;
a data cable adapted to be connected to a water meter from
the circuit board transponder to communicate water
meter readings to the transponder,
whereby a remote unit can transmit a query to the transponder assembly for reply of water meter readings and
wherein the controller is configured control and activate
operational functions of the water pit transponder
assembly including these states:

a sleep-state mode requiring low power for a substantial majority of the time;
a receive state to check for RF signals from a remote unit and to act on received RF signals, and
a transmit mode activated upon receipt of encoded meter readings from the encoder,
whereby a remote unit can transmit a query to the transponder assembly for reply with meter readings as of one of several times in a day over a period.

34. A water pit meter reading transponder assembly comprising;
a housing adapted to be mounted to a water pit lid;
a circuit board transponder within the housing including a transmitter, receiver, controller and antenna;
tamper detection circuit connected to the controller to indicate tampering with the assembly;
a data cable adapted to be connected to a water meter from the circuit board transponder to communicate water meter readings to the transponder, the controller being adapted to receive and store daily meter readings from the water meter for thirty five days,
whereby a remote unit can transmit a query to the transponder assembly for reply of meter readings of a full monthly billing cycle and/or a tamper condition.

35. A water pit meter reading transponder assembly comprising;
a housing adapted to extend through and be mounted to a water pit lid, the portion extending through the pit lid having first threads and a first hole,
a mounting cap having second threads configured to mate with the first threads so the cap can be screwed to the portion extending through the pit lid and having a second hole that is aligned with the first hole at a rotation of the mounting cap with respect to the portion;
a plug configured to pass through the aligned first and second holes to prevent rotation of the mounting cap and thereby prevent its being unscrewed from the portion,
a circuit board transponder within the housing including a transmitter, receiver, controller and antenna;
a data cable adapted to be connected to a water meter from the circuit board transponder to communicate water meter readings to the transponder, the controller being adapted to receive and store meter readings from the water meter, and
a tamper detection circuit connected to the controller to indicate tampering with the assembly.

36. A method of RF communication with a water pit meter reading transponder assembly comprising;
sending a data request from a remote unit to the transponder located at a water meter pit by RF transmission from the remote unit;
receiving the signal in the transponder in a first antenna and receiver,
processing the received signal to compile a reply; and
sending the reply from the transponder to the remote unit by an RF transmission from a transmitter and second antenna.

37. A method as claimed in claim 36 wherein the RF transmissions to the transponder and from the transponder are at different frequencies.

38. A method of assembling a water pit meter reading transponder assembly comprising;
mounting plastic shields to cover transponder electronics;
installing the transponder electronics within a closed, but unsealed, housing configured to mount to a pit lid of a water meter pit; and
putting a protective material into the housing to encapsulate the transceiver electronics to provide environmental protection to the transceiver electronics within the housing, whereby the plastic shields prevent frequency detuning caused by the protective encapsulating material.

39. A method of operation of a water pit meter reading transponder assembly comprising;
mounting a water pit meter reading transponder assembly to a water pit lid and connecting the transponder to a water meter in the water pit so meter readings are received in the transponder assembly;
maintaining the transponder assembly in a sleep-state mode requiring little power for a substantial majority of the time;
periodically activating a receive state to check for RF signals from a remote unit, and
if no valid signal is received within a predetermined period, reverting to sleep mode, and
if a valid signal is received, processing a message received from the remote transmitter/receiver.

40. A method as claimed in claim 39 wherein processing a received message includes encoding and transmitting a meter-reading message.

41. A method as claimed in claim 39 wherein processing a received message includes encoding and transmitting a stored tamper condition indication.

42. A method as claimed in claim 39 wherein when the transponder is in the sleep-state mode, the transponder receives and records water meter indicia and keeps time to determine when to leave the sleep-state mode.

43. A method as claimed in claim 39 further comprising periodically sweeping a receiver frequency band to determine if it is stable and functioning properly.

44. A method as claimed in claim 39 including storing meter readings multiple times a day.

45. A method as claimed in claim 39 including receiving and storing meter readings for a set period of time.

46. A method as claimed in claim 39 including receiving and storing daily meter readings for thirty-five days.

47. A method of operation of a water pit meter reading transponder assembly comprising
mounting a water pit meter reading transponder assembly to a water pit lid and connecting the transponder to a water meter in the water pit so meter readings are received in the transponder assembly; and
storing meter readings multiple times a day.

48. A method of operation of a water pit meter reading transponder assembly comprising;
mounting a water pit meter reading transponder assembly to a water pit lid and connecting the transponder to a water meter in the water pit so meter readings are received in the transponder assembly; and
periodically electronically checking for evidence of tampering with the assembly.

49. A method of operation of a water pit meter reading transponder assembly as claimed in claim 48 wherein checking for evidence of tampering includes sending an electrical pulse along a length of an interface cable to an end of the interface cable, awaiting a return pulse from the end, and indicating a tamper condition if no pulse is returned.

50. A method of operation of a water pit meter reading transponder assembly as claimed in claim 48 wherein checking for evidence of tampering includes indicating a tamper condition if data from an encoder is corrupted.

51. A method of RF communication with a water pit meter reading transponder assembly comprising;

sending a data request from a remote unit to the transponder located at a water meter pit by RF transmission signal at a first frequency;
receiving the signal in the transponder,
processing the received signal to compile a reply; and sending the reply from the transponder to the remote unit by an RF transmission at a second frequency different from the first frequency.

* * * * *